United States Patent
Zellweger

(10) Patent No.: US 6,401,096 B1
(45) Date of Patent: Jun. 4, 2002

(54) METHOD AND APPARATUS FOR GENERATING USER PROFILE REPORTS USING A CONTENT MENU

(75) Inventor: Paul Zellweger, 82 Fresh Pond La., Cambridge, MA (US) 02138

(73) Assignee: Paul Zellweger, Cambridge, MA (US)

( * ) Notice: Subject to any disclaimer, the term of this patent is extended or adjusted under 35 U.S.C. 154(b) by 0 days.

(21) Appl. No.: 09/277,015

(22) Filed: Mar. 26, 1999

(51) Int. Cl.[7] .............................. G06F 17/00; G09G 5/08
(52) U.S. Cl. ........................................ 707/100; 345/810
(58) Field of Search .............................. 707/100–104, 707/500, 1–6; 345/332, 333, 810, 336, 338; 709/1, 100; 717/1, 4, 5, 11

(56) References Cited

U.S. PATENT DOCUMENTS

| | | | | |
|---|---|---|---|---|
| 5,261,042 A | * | 11/1993 | Brandt | 345/333 |
| 5,519,859 A | * | 5/1996 | Grace | 707/3 |
| 5,630,117 A | * | 5/1997 | Oren et al. | 707/100 |

* cited by examiner

Primary Examiner—Hosain T. Alam
Assistant Examiner—Alford W. Kindred

(57) ABSTRACT

A menu authoring system is disclosed that enables developers to tag menu entries and track end-user selections. The authoring system is based on the prior art of the open hierarchical data structure to generate a content menu. The prior structure manages a network of menu paths that intersect and overlap, enabling multiple paths to reach the same destination. Developers employ this prior art to create different menu paths to serve different types of end users. Advances brought about by the present invention enable[s] the developer to identify different types of end-user groups, collect data, and analyze it over time.

24 Claims, 17 Drawing Sheets

Aternative Embodiment

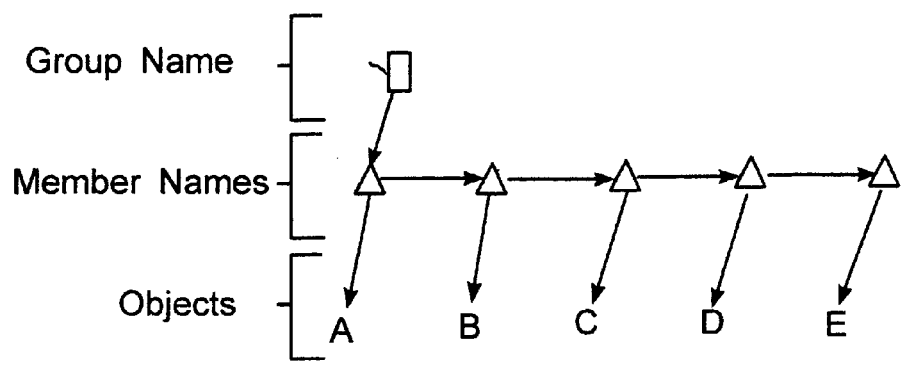
Fig. 7b.1
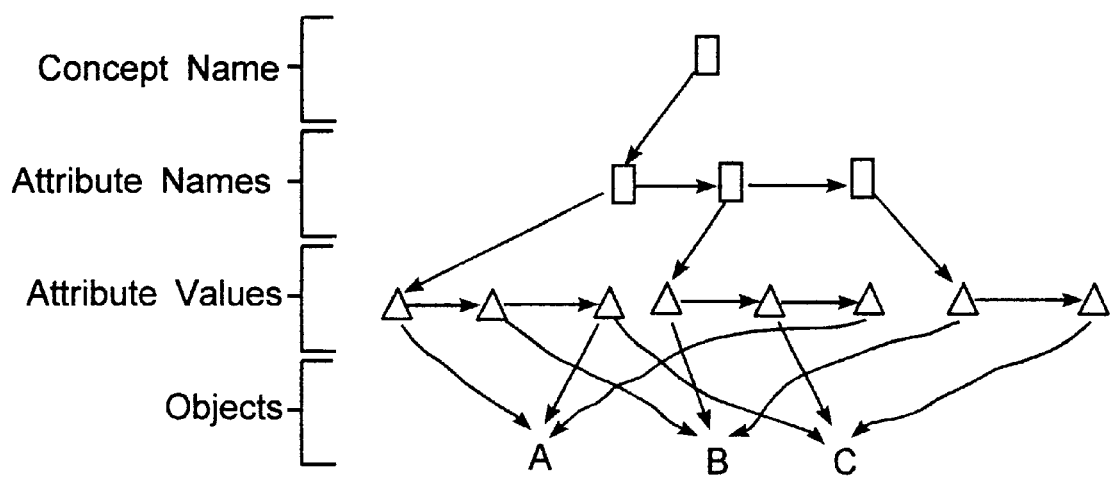
Fig. 7b.2

110

Topic: Author

User Tags | Object Tags

Paths:
- Author
- Language
- Subject
- Title
- New Entry

Usage:
- American English
- British Usage
- New Entry

Note:

Close

SELECTIONS:  USER_ID
             TIME_STAMP
             NODE_ID
             PATH_ID
             USAGE_ID
             GROUP_TAG

| Group Tags ||
|---|---|
| Value | Usage |
| 1 | Group Name |
| 2 | Member Name |
| 3 | Attribute Name |
| n > 3 | Virtual Group Name |

130
↙

PATHS:  OBJ_ID
        TRANS_TIME
        TRANS_DATE
        LAPSE_TIME
        NAVIGATION_TIME
        PATH_ID
        USAGE_ID
        GROUP_ID
        MEMBER_ID
        ATTRIBUTE_ID

METHOD AND APPARATUS FOR GENERATING USER PROFILE REPORTS USING A CONTENT MENU

CROSS REFERENCE TO RELATED APPLICATION

This application is based on Provisional Application No. 60/065,434 entitled "Method and Apparatus For Generating User Profile Reports Using An End-User Menu Access Path", filed Oct. 30, 1997.

FIELD OF THE INVENTION

The present invention relates to computer software used to build and manage an end-user menu system, and in particular, it relates to a refinement of an end-user access method identified as a content menu that records menu paths selected by end-users and generates end-user profiles.

REFERENCES

U.S. Patent Documents

| | | |
|---|---|---|
| 6,243,700 | 5/21/01 | Zellweger |
| 5,819,285 | 10/6/98 | Damico ct. al. |
| 5,796,952 | 8/18/98 | Davis and Jain |
| 5,717,860 | 2/10/98 | Graber et. al. |
| 5,630,125 | 5/13/97 | Zellweger |
| 5,630,117 | 5/13/97 | Oren et al. |
| 5,519,859 | 5/21/96 | Grace |
| 5,261,042 | 11/09/93 | Brandt |

| | | |
|---|---|---|
| 09/080,102 | 5/16/98 | Zellweger |
| [09/080,100 | 5/16/98 | Zellweger] |

OTHER REFERENCES

Knox, Richard. "What in the World do they mean?—Science Prose mutating into unreadable jargon", Boston Globe, May 11, 1992, pp. 25, 28–29.

Zellweger, Paul. Web-based Sales: Defining the Cognitve Buyer. International Journal of Electronic Markets, Volume 7-3. Sep. 1997, pp. 10–14.

BACKGROUND

A common complaint with the World Wide Web is that content providers often know very little about their users. That is, little is known about end-users on the Web because they are able to view information in complete anonynmity. Yet, users of the Web are not a homogeneous group. Differences can be readily attributed to cognitive factors such as their content mastery or knowledge and understanding of the information found on a web site. Another such factor is word-usage where the preference for one word over another reflects a user's background or experience.

In an interactive environment like the Web, links to information can easily represent these factors, especially when multiple link paths reach the same sought after object. For example, a novice path could have more detailed steps that help explain and instruct, while an expert path could reach the same information using more direct steps. In addition, specific words or terms in a link could represent different tell-tale characteristics that could signify differences among end-users seeking out the same thing.

Therefore, a network of hypertext links on the Web could represent end-user differences but until the disclosure of content menus (Zellweger May 16, 1998 U.S. Pat. No. 5,630,125), there was no comprehensive way to build and maintain it. This prior disclosure teaches the art of a menu system based on an open hierarchical data structure. The approach is distinctive because its underlying structure allows multiple menu paths to reach the same information object. End-users navigate nested list menus derived from the structure to reach information at the end of a path. Prior disclosures by Zellweger also teach how to implement a content menu in a client server that enhances performance using hypertext files (May 16, 1998 U.S. Pat. No. 09/080, 100), and Java applets (May 16, 1998 Ser. No. 09/080,102). However, none of these prior disclosures teach how to assign tags to menu topics, manage them, and use them to generate end-user profiles.

Prior attempts to identify end-user characteristics on the Web include Graber et. al. (U.S. Pat. No. 5,717,860 Feb. 10, 1998) that teach how to track end-user navigation from one Web site to another, and Damico et. al. (U.S. Pat. No. 5,819,285 Oct. 6, 1998) that teach how to assign and manage end-user identification numbers associated with predetermined marketing sources. However, these disclosures rely exclusively on navigating from one Web site to another and not navigating within the same Web site. Other attempts to identify end-user characteristics include Davis and Jain (U.S. Pat. No. 5,796,952 Aug. 18, 1998) that teach how to generate profiles based on how much time endusers spend with a downloaded file and what selections they make. However, none of this prior art teaches how to construct a succession of hypertext files that an end-user call navigate to find information and that a provider can use to generate end-user profiles.

Refinements brought about by the present invention transform the content menu into a powerful marketing research tool. Marketing professionals can analyze a target market according to customers' knowledge and understanding of product content. Through a process called cognitive segmentation, marketers can now identify groups of customers according to amount of help or detail they need to find a product. With the refinements of the present invention they can assign tags to menu entries to track their menu selections, generate reports, and monitor this behavior over time. The net result is an empirical marketing tool that gives marketers hard numbers on who their customers are.

OBJECTS AND ADVANTAGES

It is a general object of the present invention to provide a refinement of a content menu system that produces a comprehensive marketing research tool. Another object of the present invention is a management system to teach how to assign different types of tags (or coded values) to a menu object and use these tags to record selections in a menu path.

One object of the present invention is to provide a graphical user interface means that enables menu developers to navigate menu topics in an open hierarchical data structure and assign tags to them.

Another object of the present invention is to enable a menu developer to assign multiple tags to a single menu topic.

One object of the present invention is to supply a menu developer with a graphical user interface that summarizes coded values associated with a menu topic.

Another object of the present invention is to retrieve tags associated with menu selections in a direct menu path.

One object of the present invention is to store tap associated with a menu path in a format that facilitates reporting over different periods of time.

Another object of the present invention is to enable marketers to generate multiple reports, including ad-hoc capabilities.

One object of die present invention is to integrate software applications or components that enhance reporting capabilities.

SUMMARY OF THE INVENTION

The objects of the present invention are attained by providing the methods and apparatus of a menu management system that serves as a marketing research tool that can generate end-user profiles and report on these profiles over time. The system includes a graphical interface that enables developers to assign and manage tags associated with menu objects stored in the prior art of the open hierarchical data structure. The present invention also teaches how to retrieve these tags when end-users reach information at the end of a menu path and how to store them for reporting.

BRIEF DESCRIPTION OF THE FIGURES

FIGS. 8a through 8c depict the graphical user interface of the present invention used to assign and maintain tags associated with menu entries in a content menu.

FIGS. 13a and 3b depict sample end-user profile reports.

DETAILED DESCRIPTION OF THE FIGURES

To demonstrate the benefits of the present invention this disclosure presents an electronic catalog of architectural books on a network like the World Wide Web.

Alternative embodiments of this invention include standalone settings where the catalog is stored on a computer disk or tape, or embedded in system software.

Throughout this disclosure, three different agents are presented: an end-user buyer, a menu developer, and a report-user. The end-user buyer is an individual who navigates the content menu in an electronic catalog to reach information about books at the end of a menu path. The menu developer is a content expert who uses the authoring system of the present invention to build the content menu and assign tags (or coded values) to menu topics. And finally, the report-user is a marketing professional, like a product manager, who uses reports, generated by the authoring system in the present invention, to make business decisions.

Figure 1:
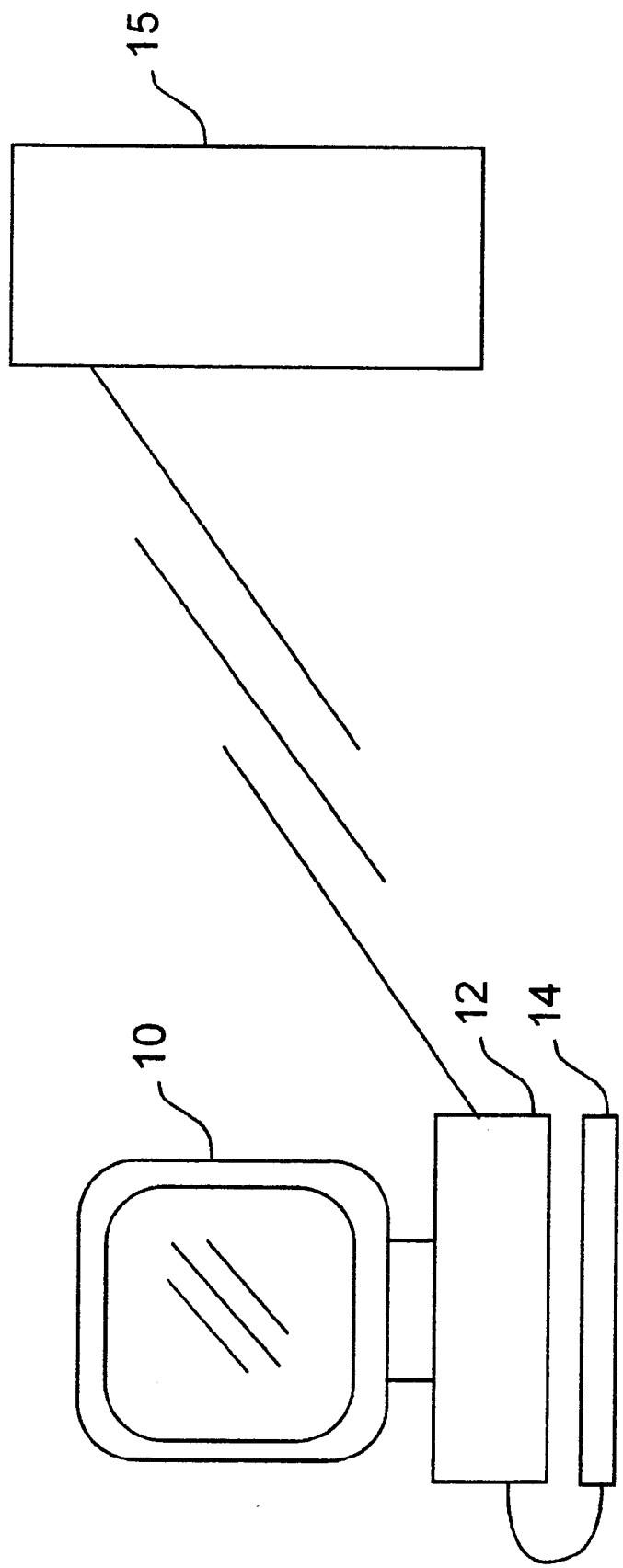
FIG. 1 depicts the client server apparatus of the present invention.

FIG. 1 depicts the client server apparatus of the embodiment presented in this disclosure. The server computer 15 contains an operating system, a database, a file server, communications software, application software to build and maintain a content menu, and scripts that distribute and control menu files associated with the content menu. A client computer 12 is linked electronically to server computer 15 via the network. The client computer 12 has its own operating system, as well as its own communications and browser software. The browser software requests and downloads menu files stored on server computer 15 and displays them on monitor 10.

Script files on server computer 15 assign a unique identifier each time a new content menu is requested by client computer 12. The script file stores tile identifier in a database on server computer 15 and then compiles the source code for the list menu requested by client 12. Each topic line in the hypertext list menu includes a call to a script file on the server that passes this identifier as a parameter.

When the end-user selects a topic from the list menu the browser on the client computer calls the script file on the server passing the identifier as a parameter. The script file on the server uses the identifier to associate the menu selection and any related tags with an end-user's progression down a menu path. Before adding this information to the selections database 115 the script generates a time stamp for the new entry.

As mentioned previously, alternative embodiments of the present invention include information systems stored and distributed on computer memory, like a CD-ROM or on a high density tape, that run on a standalone computer. In this computing environment, the present invention employs password protected access methods to track and record end-user menu selections in a menu path.

Figure 2:
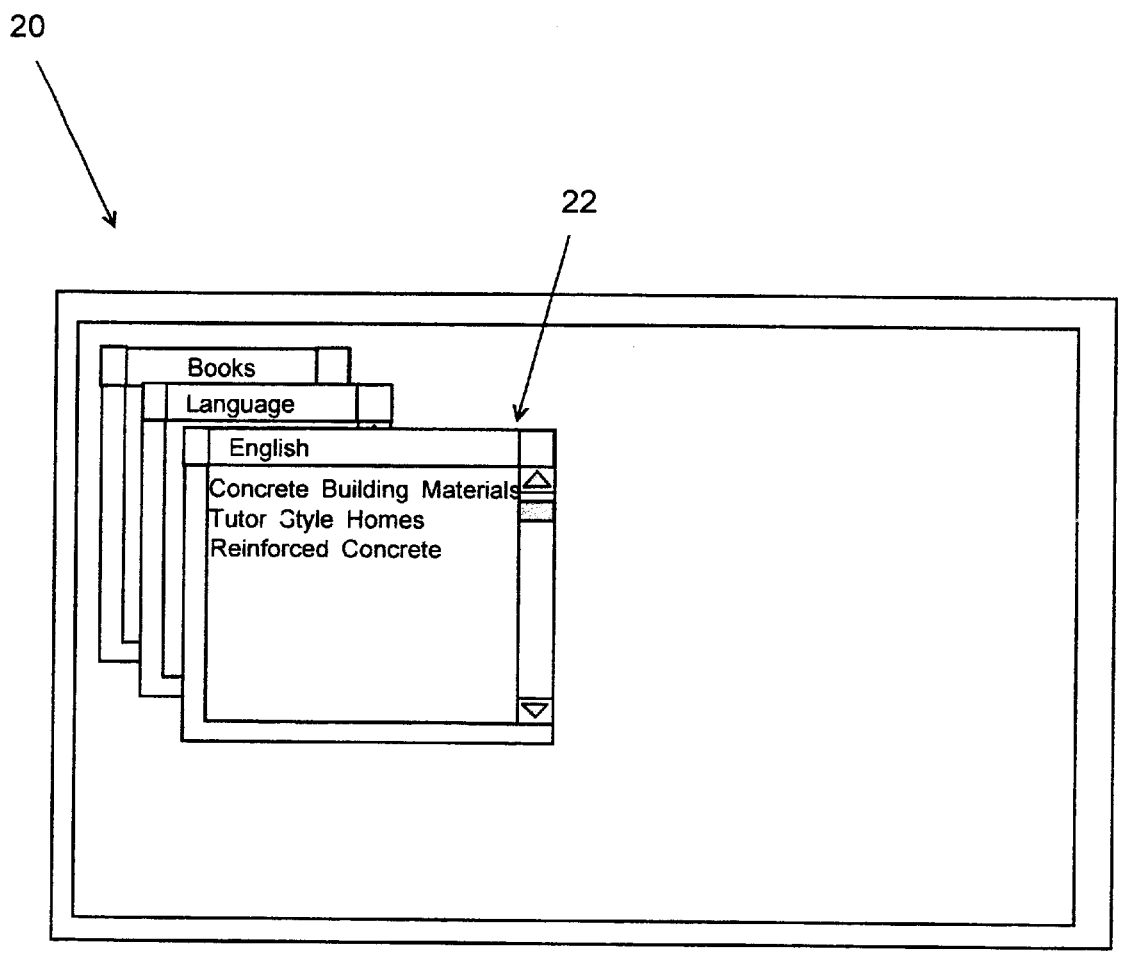
FIG. 2 depicts a graphic representation of a content menu.

A graphic representation of content menu 20, the prior art, is depicted in FIG. 2. Menu 20 consists of a succession of nested list menus that organize content like an index in the back of a book. Each topic in a list menu links either to another list menu 22 or to information on a book. End-users navigate its list menus to reach this information at the end of a menu path. The list menus in 20 directly correspond to the nodes and paths in the prior art of an open hierarchical data structure. The distinctive feature of this particular structure is that it enables multiple paths to reach the same information. In the example depicted in this figure, the buyer navigates these list menus to locate books written in English.

Figure 3:
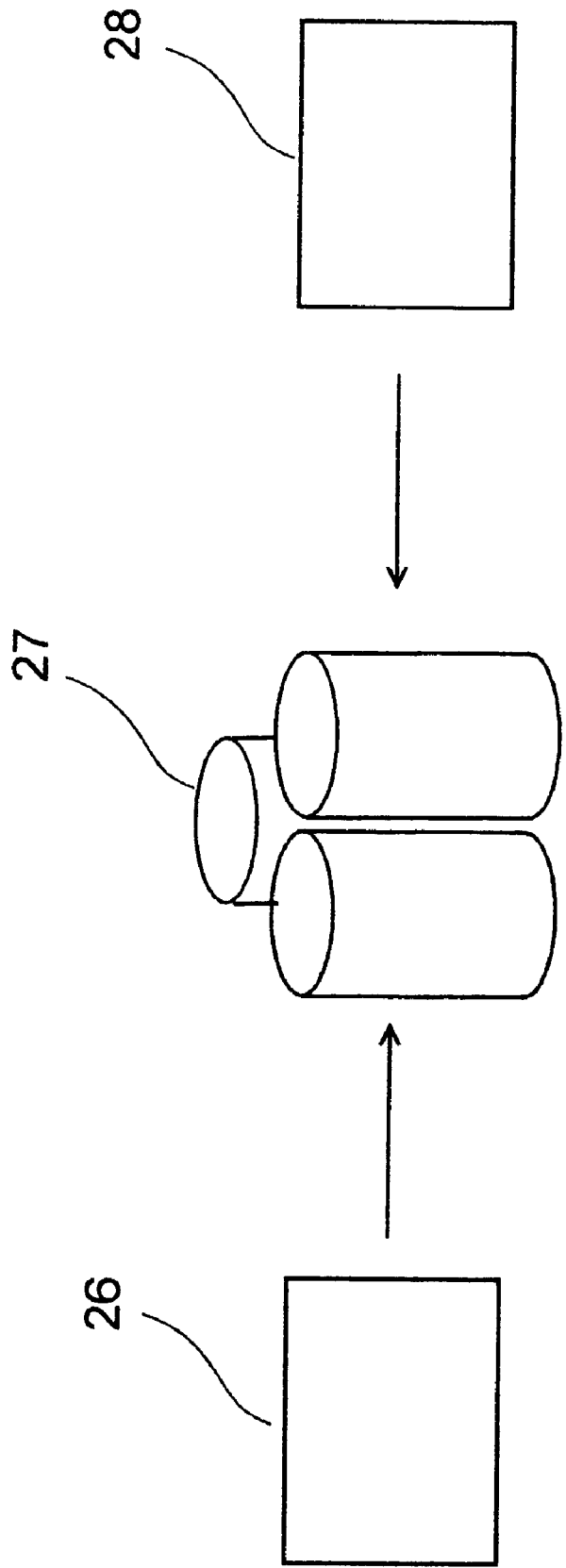
FIG. 3 depicts the software components of the information management system used to create and manage a content menu.

The primary software components of the prior art of content menu 20 are depicted in FIG. 3 and include an authoring system 26, menu files 27, and browser software 28. Improvements brought about by the present invention refine authoring system 26 and menu files 27. The menu developer uses the prior art of the authoring system 26 to create and manage an open hierarchical data structure. The developer uses improvements in the authoring system 26 brought about by the present invention to add tags to the structure and manage them. In addition, the authoring system 26 in the present invention enables developers to integrate commercially available statistical and graphical packages to analyze this data and produce reports.

Menu files 27 in the present invention include hypertext menu files as well as script files installed on server computer 15. As mentioned previously, these script files assign identifiers, generate hypertext list files, store and retrieve users' selections, and generate data on menu paths on the server.

The browser software 28, the third software component of the preferred embodiment consists of standard commercial browsers like Netscape Navigator or the Microsoft Internet Explorer. In alternative embodiments of the present invention, the authoring system 26 generates dedicated menu files 27 for target custom-built browsers.

In the preferred embodiment of the present invention, the authoring system 26 generates hypertext-based list menus. The authoring system 26 of the present invention, however, is not limited in scope to this technical implementation or network embodiment. Alternative embodiments of the present invention enable developers to assign tags and generate content menu files that include them in a variety of different programming languages and settings, including applets running on a client computer and custom-built browsers on the smallest computers.

Figure 4:
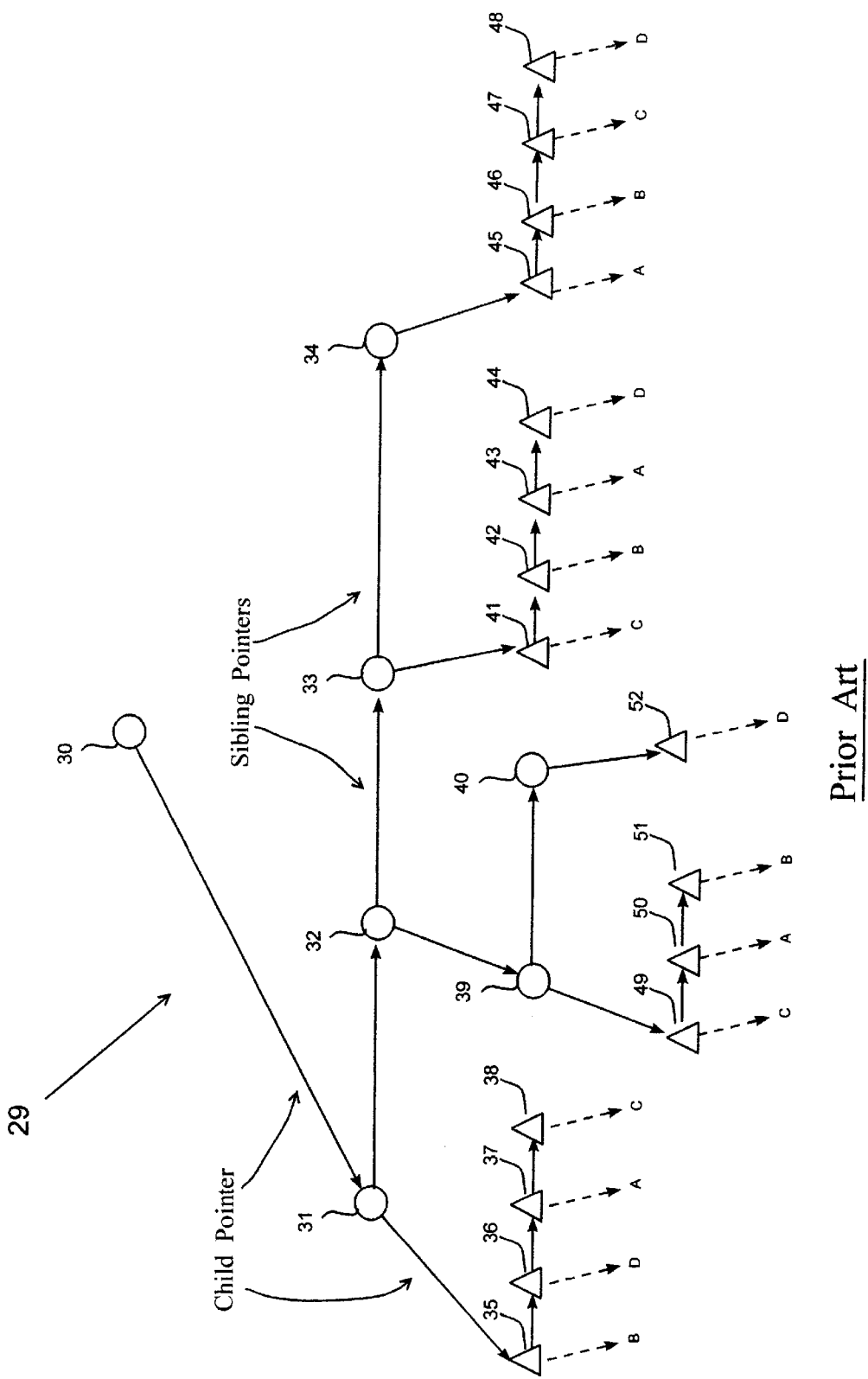
FIG. 4 depicts the open hierarchical data structure used to generate the content menu.

Menu authoring system 26 employs the prior art of an open hierarchical data structure 29, depicted in FIG. 4, to create and manage the content menu 20. Flow progresses downward from a root node 30 to a data (or leaf) node 35 at the end of a path that links to book information C. Branching nodes, like node 31 or node 34, are internal nodes that connect a root node 0 to a leaf node. Each branching in an open hierarchical data structure links to a data node at the end of a path in the structure, or to another branching node.

All nodes below root node 0 can have a child pointer and a sibling pointer. In effect, these nodes have a maximum of two outgoing arcs. However, any node in structure 29 below the root can have more than one incoming arc. Prior disclosures about structure 29 reveal that its multiple incoming arcs enable it to support multiple paths from a root node 0 to an information object.

Figure 5:
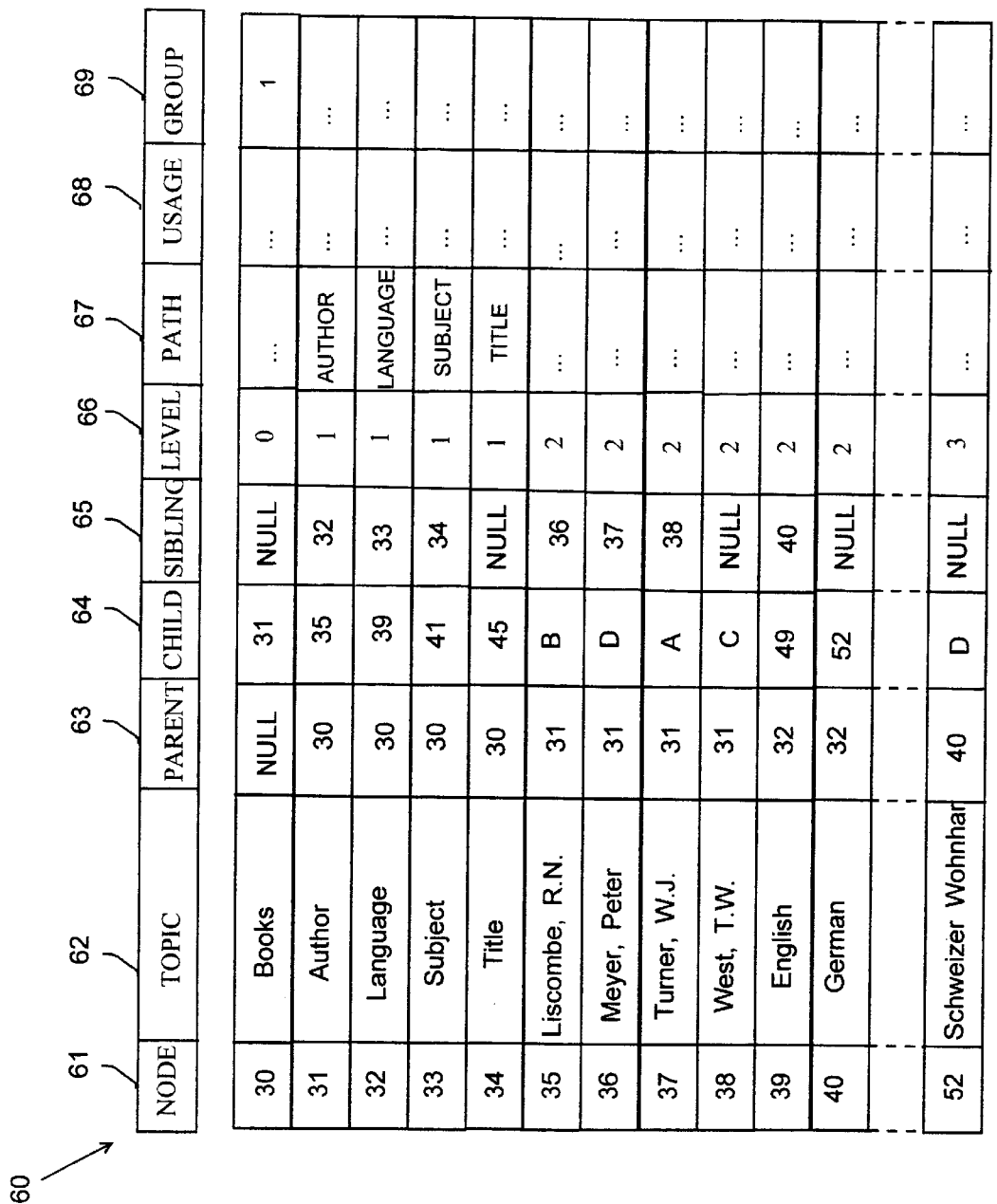
FIG. 5 depicts a database structure used to store nodes in an open hierarchical data structure.

An information key, such as a word or phrase, associated with a node represents an entry in a list menu. In the preferred embodiment of the present invention, information associated with each node in structure 29 is stored in a database structure 60, depicted in FIG. 5, and used to generate a list menu 21 in content menu 22. Alternative embodiments of the authoring system 26 store node information in structure 29 in a predetermined file format.

Parent 63 and Child 64 in 60 organize nodes into lists and sublists. All nodes with the same Parent 63 value form a list, and Child 64 values represents links to the next object in the succession, either another list or an information object.

Advances brought about by the present invention include storing tags in database structure 60 and using this tag information to track and record end-users' selections in a menu path.

Tags help a report user identify characteristics about the end-users who navigate a content menu. Path 67, Usage 68, and Group 69 in 60 represent three different types of tags he or she can use. Path tags identify a characteristic of a path segment in a content menu, such as cognitive strategy or level of difficulty. Usage tags identify tell-tale characteristics about a menu entry that reveals something relevant about the end-user. For instance, a British end-user would be more likely to select a "lift" entry over an "elevator", its American usage counterpart. And lastly, Group 69 establishes a set of relationships on path segments that enable a report user to compare end-user characteristics across a set of different objects.

Figure 6A:
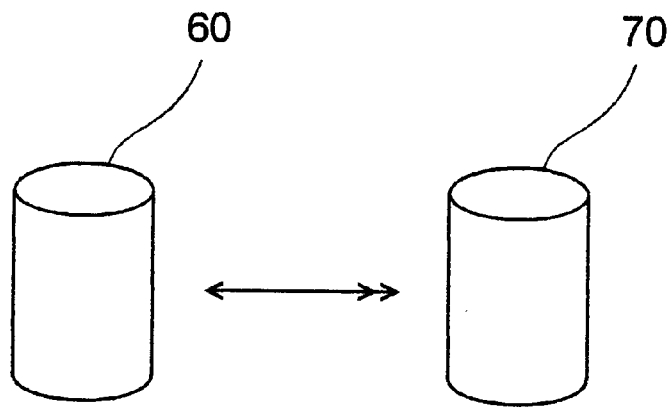
FIGS. 6a and 6b depict the relationship between a tags database and a nodes database.

The authoring system 26 in the present invention stores descriptive information about each tag such as its name, id, and tag type in database structure 70, depicted in FIG. 6a. Each tag record in 70 has a one-to-many relationship to records in structure 60, using the tag id as a link between the structures.

Figure 6B:
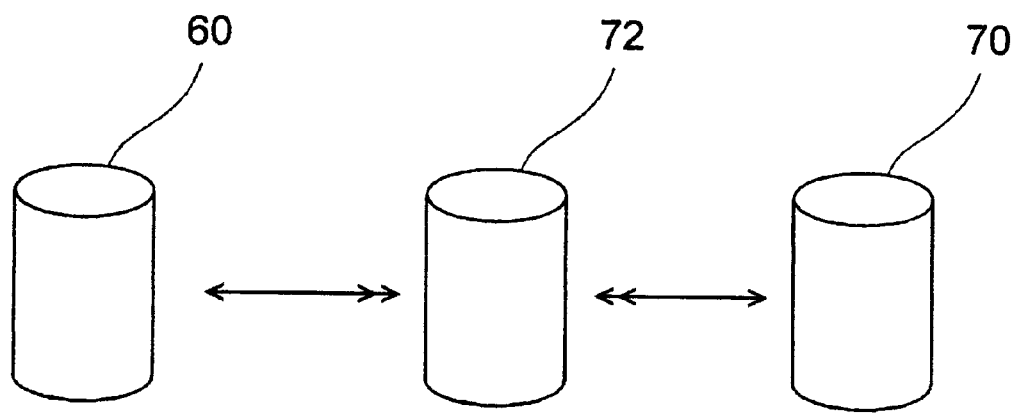

Note that in this example, each Path 67 or Usage 68 tag represents a unique set of characteristics that do not overlap. For instance, Path 67 values represent four different starting points or search strategies. In alternative embodiments of the present invention, depicted in FIG. 6b, multiple sets of path values overlap each other. So Path 67 tags in this alternative embodiment call represent a variety of search strategies or cognitive associations, as well as a variety of paths that represent different levels of content mastery. In this alternative embodiment, each node in structure 60 has one or more path tag records in database 72. Each record in database 72 contains a node element and a tag id element. The node element in the database 72 record creates a many-to-one relationship to database structure 60, and its tag id element creates a many-to-one relationship with the tag lookup database structure 70.

FIGS. 7a through 7e depict the graphical user interface (GUI) of authoring system 26 in the present invention. This GUI enables content menu developers and report users to assign tags to nodes in structure 29 and generate reports on end-user characteristics. Developers use command windows 7a and 7b to declare tags and configure the system.

The present invention employs two different types of tags: user tags and object tags. User tags associate end-user characters or attributes to structural elements in 29 represented in 60. This includes path tags that identify a characteristic about a menu topic and its path segment, such as a level of difficulty, a cognitive association, or search strategy. It also includes usage tags that identify a tell-tale aspect about a menu entry or topic, such as a regional way to describe something or wording that is reflective of a particular type of background or formal training. Report users and menu developers assign object tags to menu entries in order to compare and analyze user tags passing through that menu entry.

Figure 7A:
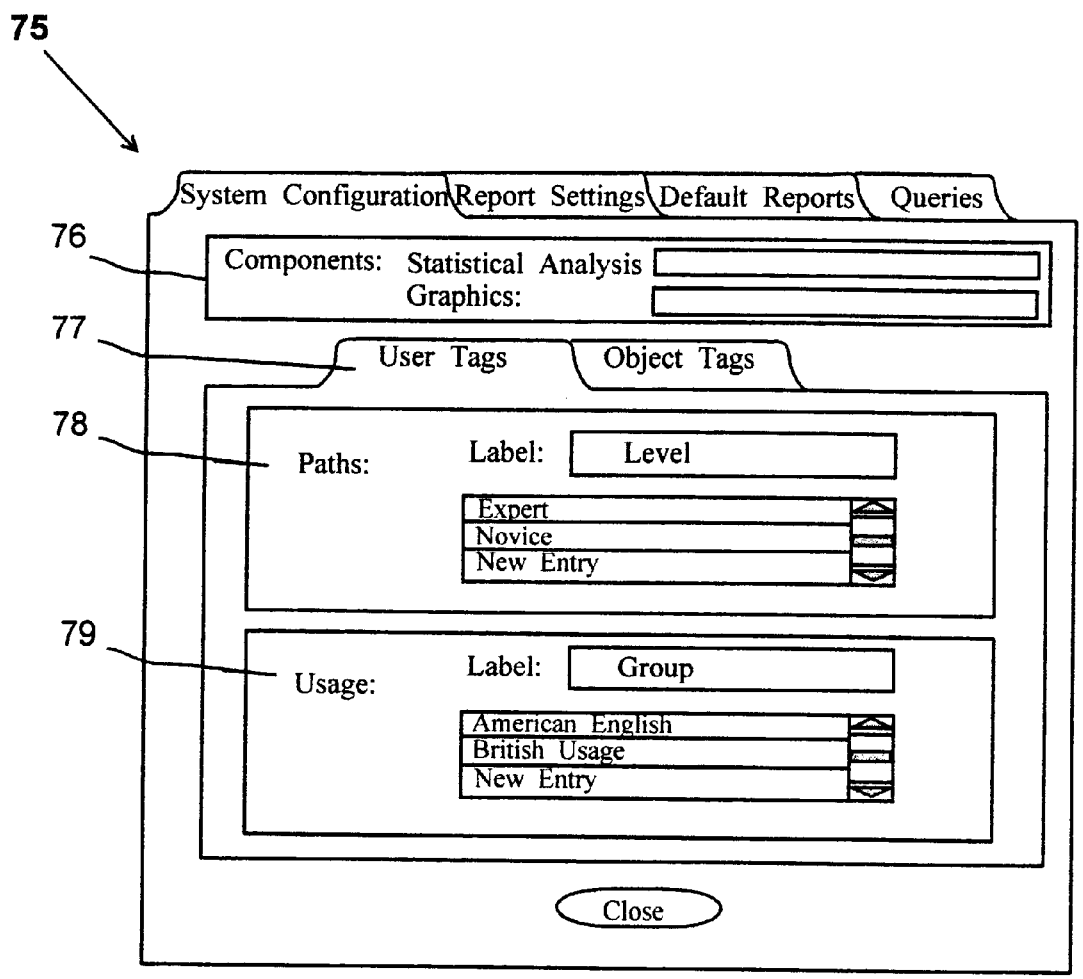
FIGS. 7a through 7e depict the graphical user interface of the present invention used to declare tags, configure the system, and generate reports.

The System Configuration command window 75 is depicted in FIG. 7a. In region 76, the developer supplies the directory path for the default statistical system, and graphics program. Commands in authoring system 26 of the present invention, such as Report Settings 85, pipe data directly to these systems thereby integrating these components in a seamless way.

The developer selects User Tags tab in 77 to declare user tags. In region 78, the developer declares one or more path tags, by selecting New Entry in the scrolling list, and filling in a tag name in the pop-window prompt. The text field associated with "Label" enables the developer to assign a more descriptive name to the set of path tags. In this example, Level is associated with the group of paths tags, Expert, Novice, etc., and will be used througout the authoring system 26 as the name for these path tags. In region 79, the developer uses the same set of controls to declare tags associated with Usage tags.

Figure 7B:
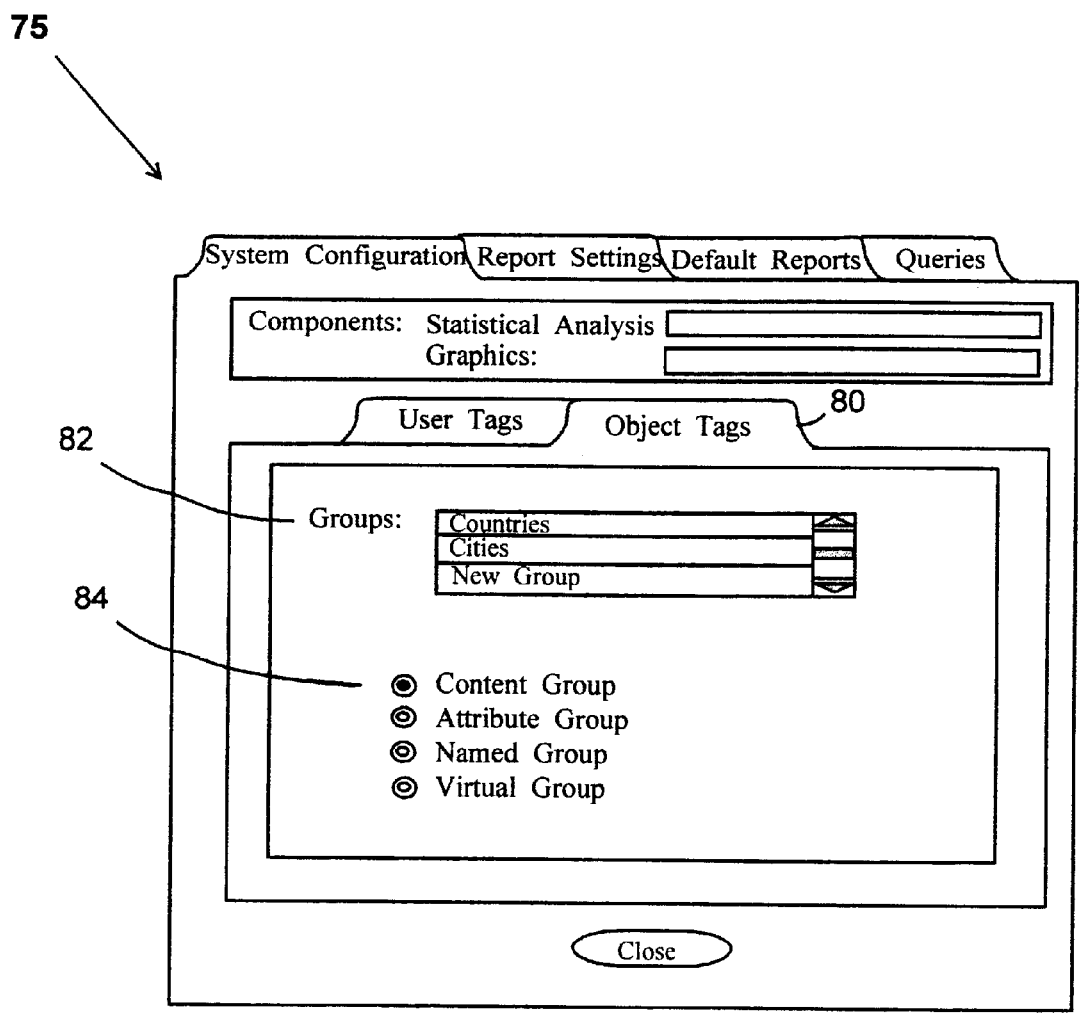

FIG. 7b depicts command window 75 when the Object Tags tab 80 is selected. The developer declares one or more group tabs in region 82 by selecting the New Group entry in the scrolling menu and filling in a group name in the pop-up window prompt. After the group name is supplied the developer selects a group type. The authoring system 26 of the present invention recognizes four different types of groups: Content Group, Attribute Group, Named Group, and a Virtual Group. Each group type represents a different set of structural relationships in 29 and has its own distinctive reporting characteristics.

A Content Group, depicted schematically in FIG. 7b.1, represents a list of nodes that have the same parent node in 29. The parent node represents a concept or category and its children represent[s] examples. Reporting on the content group focuses on the distribution of user tags across the child nodes using an analysis of variance (ANOVA).

An Attribute Group, depicted schematically in FIG. 7b.2, represents a more complex set of relations that is distinctive to structure 29 and content menu 20. Here a group name, i.e. gift boxes, links to a list of named attributes, i.e., "color", "size", and "shape", that in turn, link to a list of their respective values, i.e., "red", "white", and "blue". Objects associated with these attributes can be found at the bottom of the network path. Reporting on an attribute value group focuses on the distribution of user tags across attribute names and values by object using on an analysis of variance (ANOVA).

A Named Group, a radio button in region 84, typically represents a content group name that excludes its children from the analysis. Reporting on a named group focuses on the distribution of user tags that pass through the tagged node.

Figure 8A:
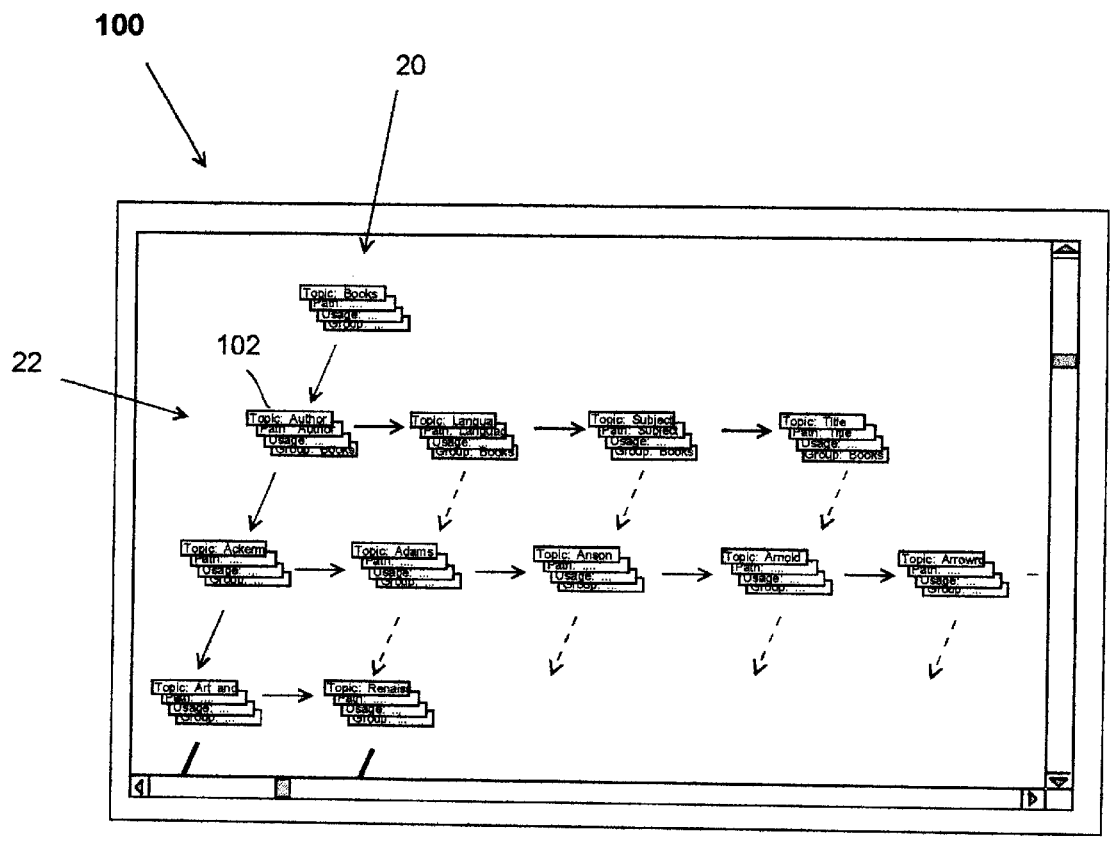
Figure 8B:
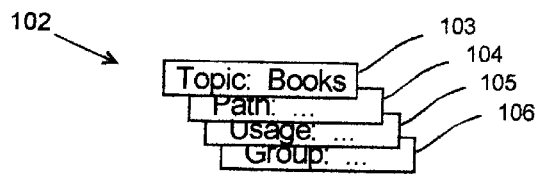

And lastly, a Virtual Croup, also represented by a radio button in region 84, enables a developer to associate one or more nodes at various locations in structure 29 to the same group name (see FIGS. 8a through 8c for details). Members of a virtual group have a logical relationship to each other that warrants analysis but, for one reason or another, this relationship is not represented in structure 29. For instance, a group of new products that could not be located under the same New Products menu heading. Assigning each one of these products to a virtual group enables marketers to statistically compare user characteristics across the group of New Products. In this respect, a virtual group functions exactly like a content group. Reporting on tie virtual group focuses on the distribution of user tags across the group's members using an analysis of variance (ANOVA).

Figure 7C:
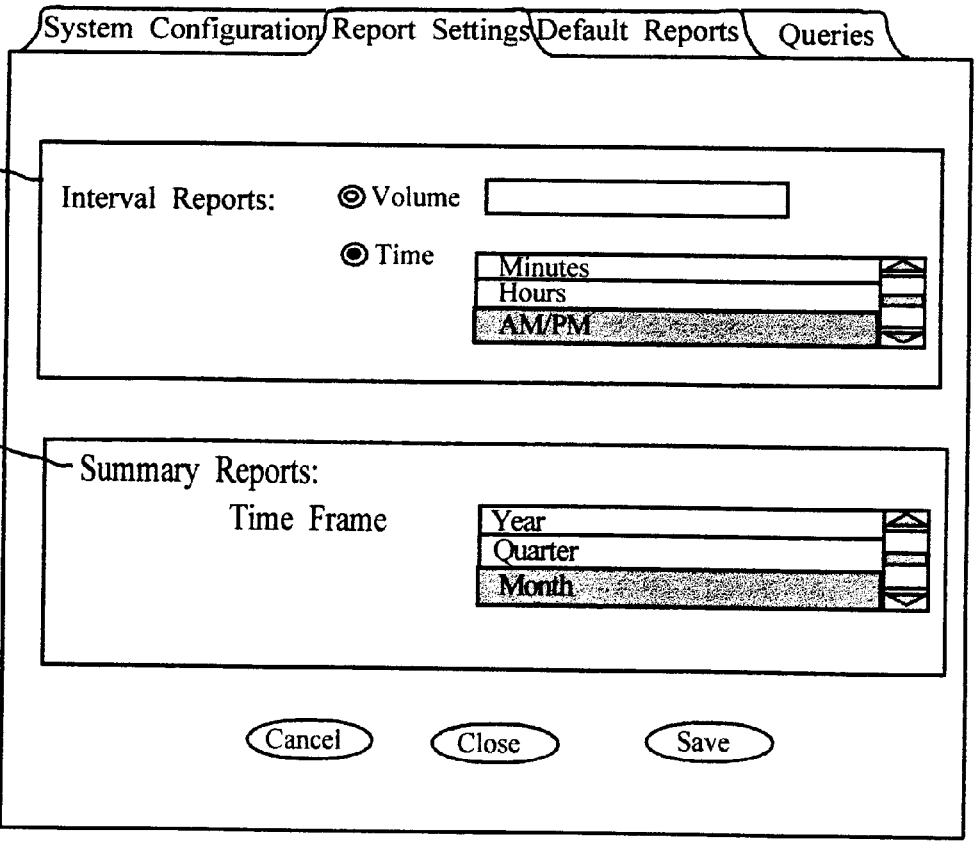

The report user employs the Report Settings command window 85, depicted in FIG. 7c, to establish how often reports are generated by authoring system 26. The report generator in 26 of the present invention fetches records from the paths database, depicted in FIG. 11a, to produce its reports. Each record represents a menu path selected by an end-user to reach an information object. The authoring system 26 produces two different types of reports, Interval Reports and Summary Reports. An interval report represents menu paths or transactions that occur within a well defined period of time, typically nothing longer than a week. In contrast, a summary report represents menu paths or transactions that occur over a longer period of time, anywhere from a day to a decade, depending on the frequency and number of menu paths or end-user transactions.

In region 86, the report user selects the volume or time parameter to signify the trigger event that generates an interval report. A volume-based report is generated every time a specific number of paths or user-transactions occur. A time-based report is generated at a specific time interval, regardless of the number of menu paths or end-user transactions. In region 87, the report user selects one or more time frames for generating summary reports. These reports, as their name implies, consolidate and summarize end-user paths and transactions over a longer period of time.

Figure 7D:
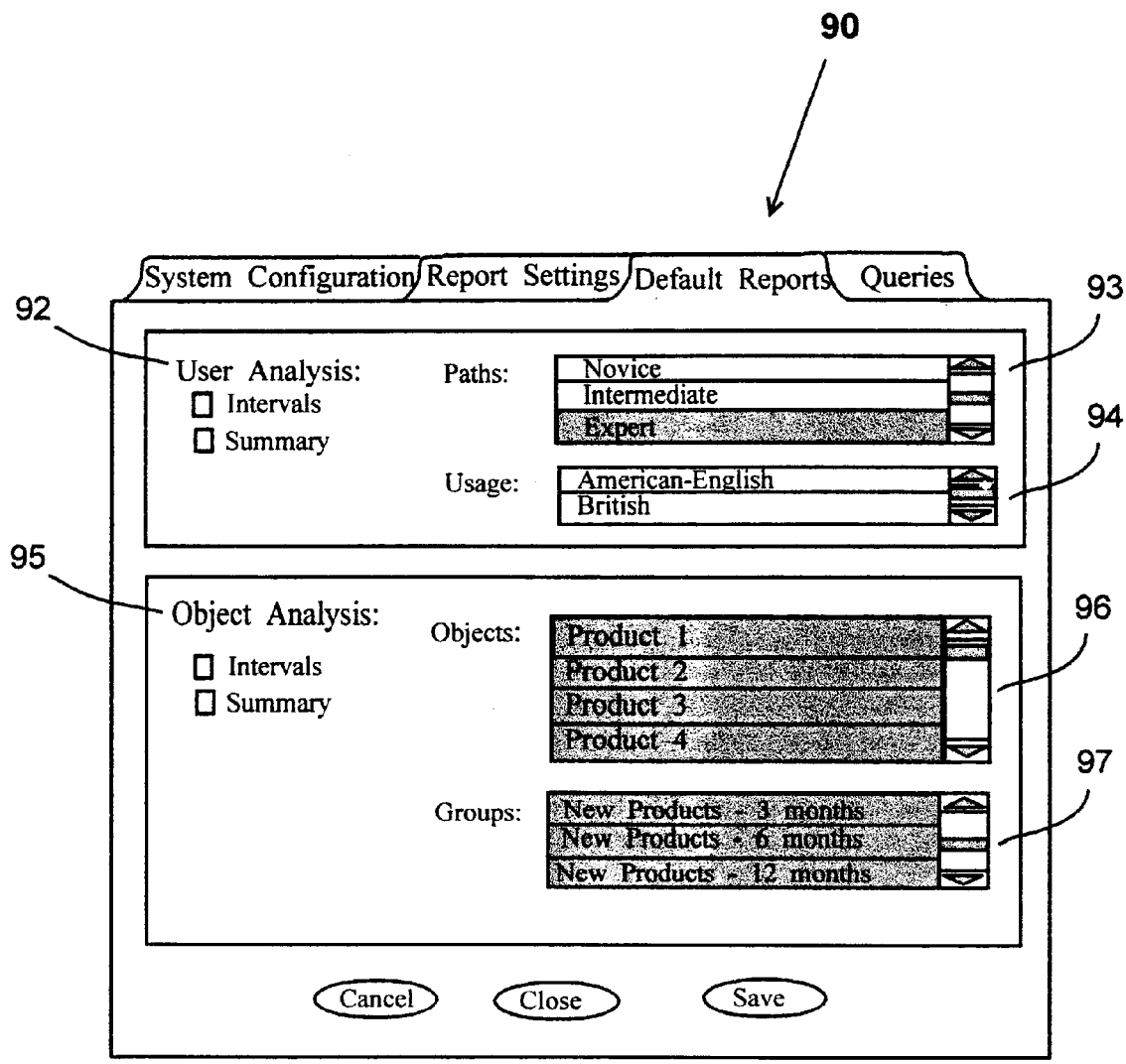

The report user employs the Default Reports command window 90, depicted in FIG. 7d, to designate what information appeals in each report. There are two types of information, user analysis and object analysis, that can appear in an Interval or Summary Report generated by authoring system 26.

Settings related to user analysis can be found in region 92. User analysis presents a snap shot of paths and usage for a given Interval or Summary time. Report users select the appropriate radio button to select and deselect paths in 93 and usage tags in 94 to include or exclude report information.

Information related to object analysis, in region 95, presents a snap shot of paths and usage for each selected object and group. Report users select the appropriate radio button to select and deselect paths in 96 and groups in 17 for the Interval and Summary reports.

Figure 7E:
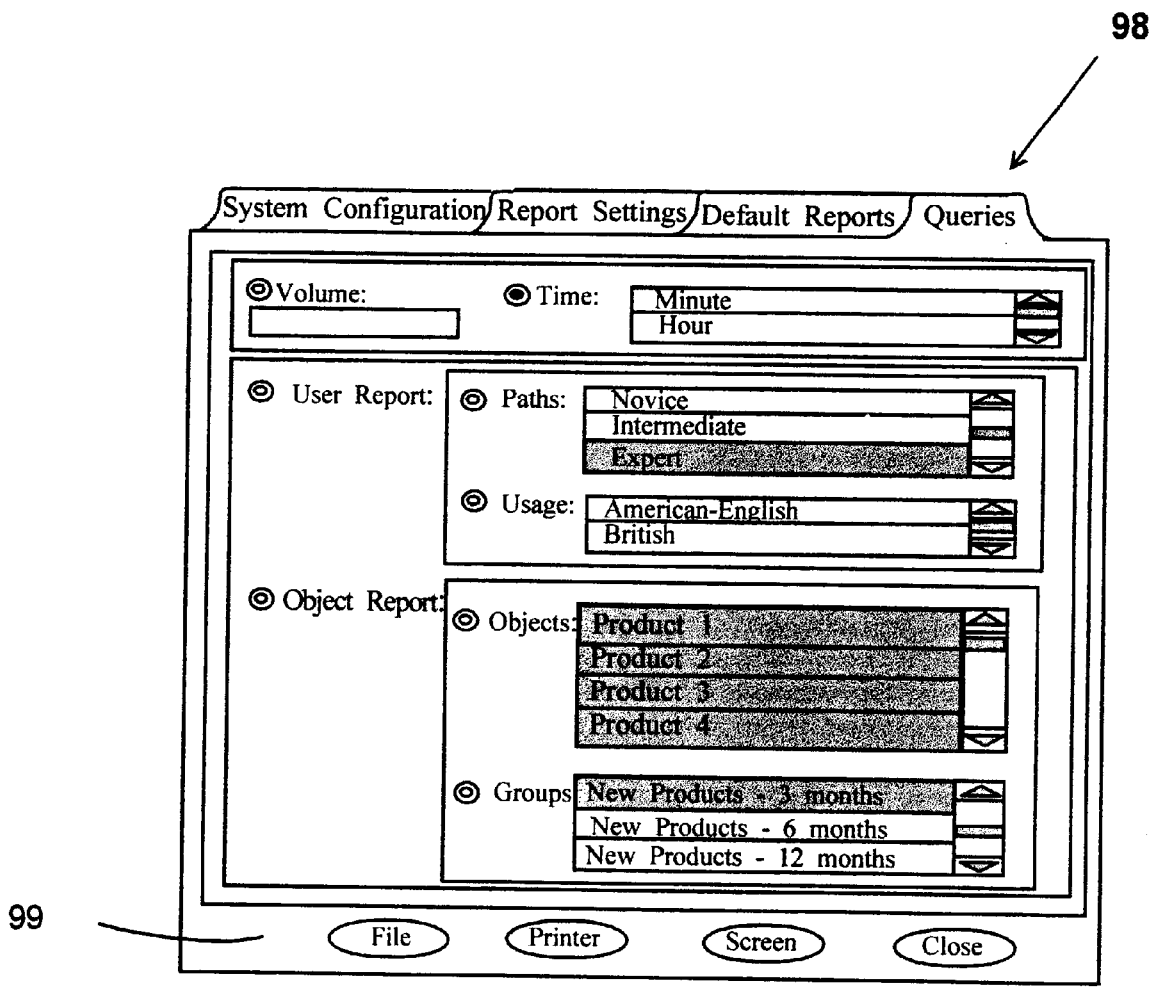

The report user employs the Query command window 98, depicted in FIG. 7e, to generate an ad-hoc or on-demand report. Controls found on this window represent a composite of controls on command windows 85 and 90. At 99, users call direct the report to a number of output devices including a monitor screen, printer, or file.

The menu developer and report user employ command windows in FIG. 8a through 8c to assign and maintain tags associated with structure 29. Command window 100, depicted in FIG. 8a, portrays a schematic representation of an open hierarchical data structure 29 and its content menu 20. Each element 102 in structure 20 directly corresponds to a node in structure 29. Arrows in command window 100, representing arcs in structure 29, correspond to sibling and child pointers. A solid line arrow depicts a relationship between one element 102 and another, where both elements are clearly visible on window 100. A dotted line arrow depicts a relationship between one element 102 and another, where the second element 102 is not visible. When a developer selects a dotted line arrow, window 100 is redrawn, and the second element and all of its immediate relations are in full display. The developer navigates structure 22 by selecting dotted arrows or by using standard scrolling devices.

FIG. 8b depicts an enlargement of element 102 in window 100. The top field 103 in 102 displays the information key 62 in database 60. Each layer beneath 103 represents a place holder for a tag type. This includes place holders for path 104, usage 105, and group 106 tags. Three periods in a place holder signifies a null tag value.

When a developer places a cursor over a field in 102, the field contents float over 102 so he or she can type in new values. The developer can also click on the field or on element 102 to display the tag management window 110 depicted it FIG. 5c. Tag management window 110 enables the developer to use a point and click technique to assign tags to a node in structure 29. Across die top of window 110 is 62, the information key, topic 62 in structure 60. The developer selects either the User Tags or Object Tags tab to display a complete list of all previously declared tags. Note, a developer can also add a new tag to either list by selecting the New Entry topic.

Figures 10A, 10B, 11A, 11B:
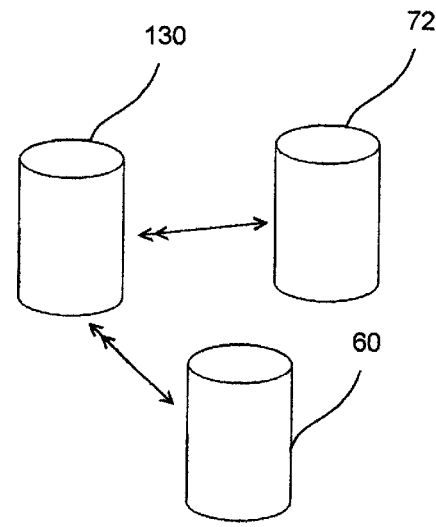
FIGS. 10a and 10b depict the selections database that stores information on the menu selections made by an end-user to reach information at the end of a menu path.
FIGS. 11a and 11b depict the paths database that summarizes selections in menu path.

In order to generate reports on user and object tags, the present invention embeds these tags and user identifier in the menu files 27 that constitute the content menu 20. When an end-user selects an entry in a list menu, a script file on the server 15 retrieves the selection and its tags, along with the user identification, and adds them to tie SELECTIONS database 115, depicted in FIG. 1A. Each record in database 115 also includes a creation date and time stamp. FIG. 10b depicts a table of group_tag values that tell script files where to get information related to the group.

Figure 12:
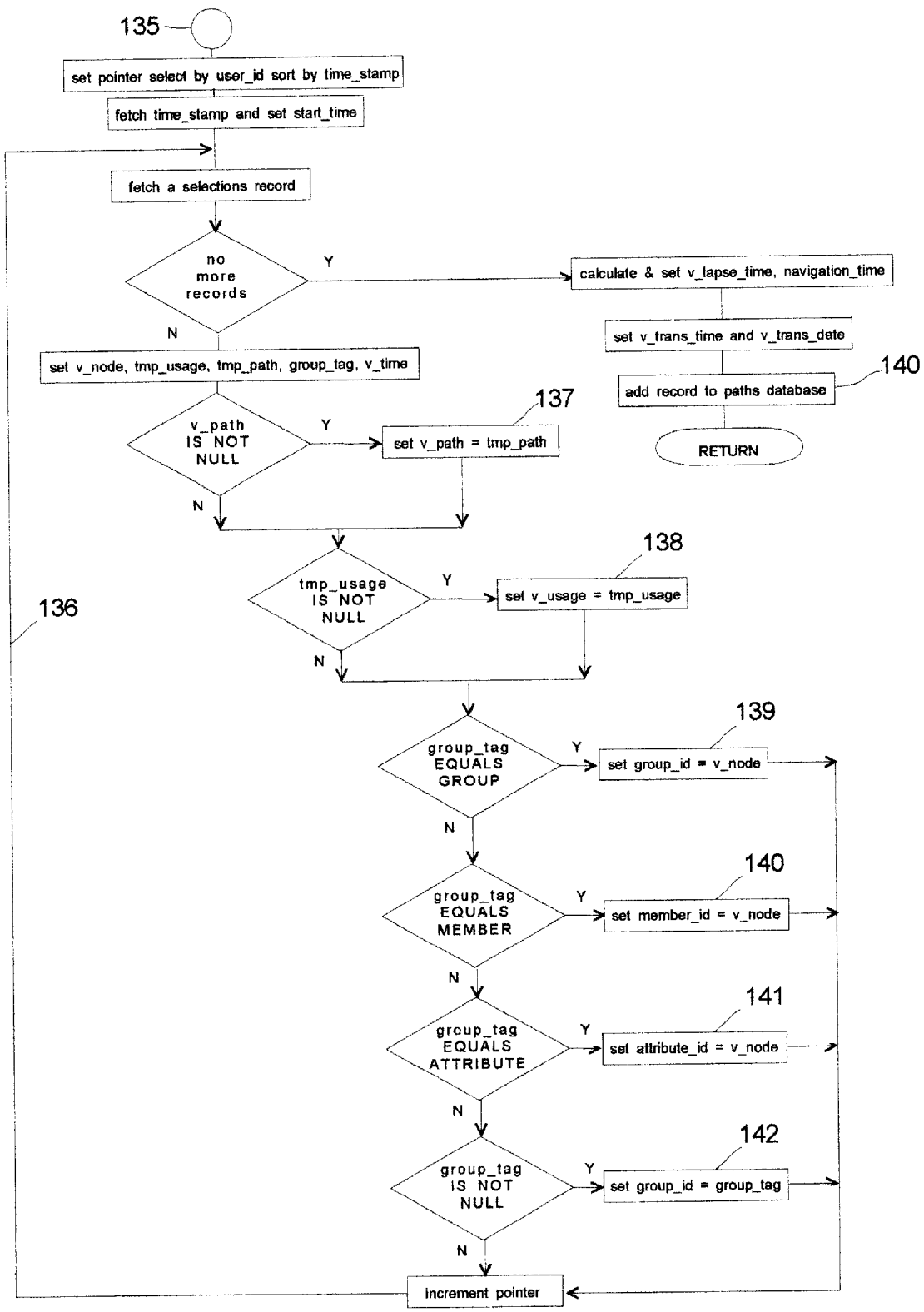
FIG. 12 depicts a graphic representation of the flow chart used to process selections in a menu path and produce an entry for the paths database.

When an end-user navigates a menu path and reaches an object, the preferred embodiment of the present invention transforms data in the SELECTIONS database 115 to a record in the PATHS database 130 (refer to FIG. 12 for details). Records in the PATHS database 130, depicted in FIG. 11a, provides the data for reports produced by the report generator in the authoring system 26 of the present invention.

Each record in database 130 includes a reference to node 61 in structure 60, a time stamp, and tag information. Tip data includes the date and time of the menu path or end-user transaction, the amount of time navigating the content menu, and the lapse time between content menu navigation and a predefined trigger event associated with an end-user transaction like ordering a book or reaching a book description. The path and usage identifiers refer to tags declared in window 110, or in region 78 of window 75. The group, member, and attribute values refer to node 61 in structure 60.

To produce reports, the report generator in the authoring system 26 of the present invention uses the Nodes database structure 60 and Tags database structure 72 as lookup database structures to fetch descriptive information that is coded in each database 130 record. FIG. 11b depicts the one-to-many relationship between structures 130 and 60, and structures 130 and 72.

In the preferred embodiment of the present invention database 130 is stored in a commercially available relational database that supports the Structured Query Language (SQL). This allows technically-oriented report users direct access to the data so they can conduct ad-hoc queries and have a more powerful way to identify relationships in the data.

The flow chart of the program logic used to transform record data in the SELECTIONS database to the PATHS database 130 is depicted in FIG. 12. When a predefined trigger event is selected by the end-user, such as reaching the end of a menu path or ordering a book from a book description window, program control in the script file on server 15 flows to 135.

As mentioned previously, the preferred embodiment of the present invention stores SELECTION records in a relational database. Therefore, the program logic depicted in the flow chart of FIG. 12 reflects this storage technology. Alternative database storage and retrieval technologies exist and can be used in place of relational database technology. However, differences in these technologies represent different program logic and flow charts even though these storage technologies can produce the same results. Therefore, the present invention is not limited to the teachings in FIG. 12 as alternative technologies, flow charts, and program logic exist and can be used to replicate this functionality.

At 135, program control declares and initializes local variables used to hold values that correspond to fields in database structure 130. Next, the script program declares a record pointer that selects records from SELECTIONS database 115 that match the unique identifier and sorts them by their time stamp. Prior to looping through these records, the script fetches the time stand in the first record to set local variables that are used to calculate navigation and lapse time.

Program control now flows to loop 136 that processes each record associated with the pointer. First, it fetches elements in the SELECTIONS record and assigns them to local variables. Next, it tests variables associated with tags to generate values for the new PATH record. When the last SELECTIONS record is reached control drops from loop 136 and variables associated with the new record are assembled and at 140 a new record gets added to PATHS database 130.

In loop 136 at 137, v_path is set to the first path tag encountered in the set of SELECTIONS records at 137 in contrast to this convention, v_usage is set to the last usage tag encountered at 138. However, these assignment conventions wholly depend upon how entries and paths in content menu 20 were designed and laid out.

The group_tag in the SELECTIONS record 115 stores codes that indicate how to set group_id, member_id, and attribute_id elements in PATHS database 130 (refer to FIG. 10b for details). So, for example, a group_tag of 2 indicates that node_id in database 115 refers to a member_id.

Figure 13A:
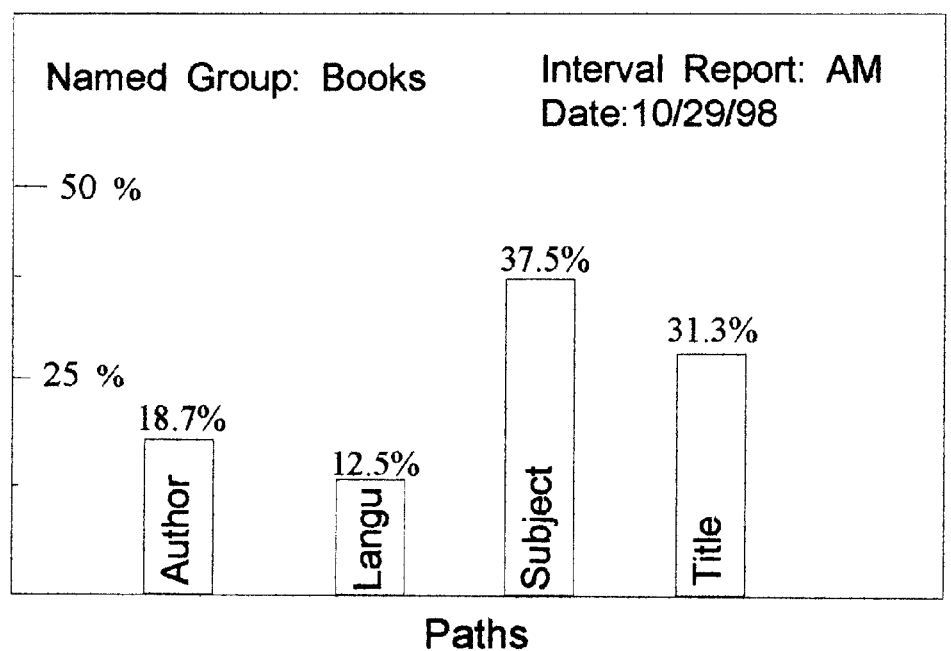
Figure 13B:
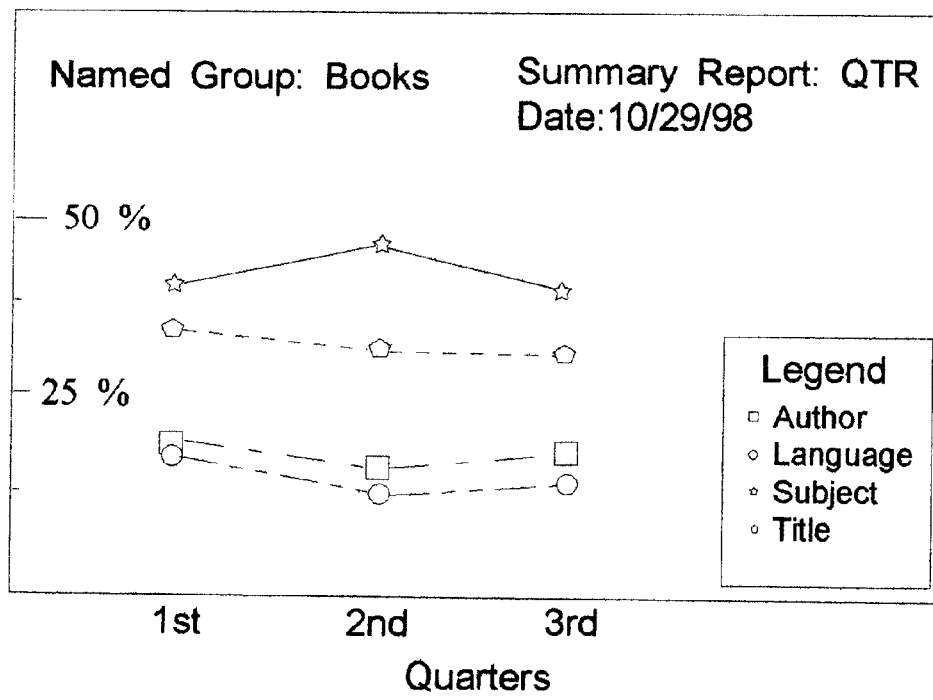

And now finally, FIGS. 13a and 13b depict examples of output reports generated by an embodiment of the present invention. As mentioned previously, the report generator selects data from the PATHS database 130, compiles it, aid then pipes it to the graphic component integrated into the authoring system 26 of the present invention to produce a report. FIG. 13a depicts an example of an Interval report on the Books group. Each bar column represents a path tag taken during an AM interval. In the Summary report, depicted in FIG. 13b, summary information about each path tag is represented by a graphic icon that is plotted out by each quarter.

CONCLUSION

This concludes the description of an embodiment of the invention. The foregoing description of the embodiment of the invention has been presented for the purpose of illustration and description. It is not intended to be exhaustive or limit the invention to the precise form disclosed. Many modifications and variations are possible in light of the above teaching. The scope of the present invention is not intended to be limited by this detailed description, but rather by the claims appended hereto.

Having described an embodiment of the invention we claim:

1. A software menu system consisting of,
   creating and maintaining an open hierarchical data structure consisting of a plurality of nodes and a plurality of paths that organizes a collection of information and provides the basis for a content menu that enables multiple paths to link to a unit of information in said collection;
   generating a menu file from said open hierarchical data structure that is cooperative with a software component that displays a list menu in said content menu that corresponds to a sibling list in said open hierarchical data structure;
   displaying a graphical user interface for assigning a tag to a node in said open hierarchical data structure that identifies a characteristic about an information key associated with said node in said open hierarchical data structure;
   storing said tag associated with said node in said open hierarchical data structure on computer memory;
   fetching said tag on computer memory and adding said tag to said menu file thereby associating said tag with an entry in said list menu;
   retrieving said tag when an end-user selects said entry in said list menu; storing said tag associated with said entry selected by said end-user in a database;

whereas said end-user locates said unit of information in said collection by navigating said content menu;

whereas said menu system manages information about said tag in said database and generates a report on information in said database.

2. The software menu system of claim 1 wherein said system is implemented in a computer program language that is compatible with at least one computer operating system.

3. The software menu system of claim 1 wherein said graphical user interface further includes assigning said tag to said node that identifies a particular path in said plurality of paths in said open hierarchical data structure.

4. The software menu system of claim 1 wherein said graphical user interface further includes displaying an interactive graphical representation of said open hierarchical data structure enabling a developer to navigate said plurality of paths in said open hierarchical data structure.

5. The software menu system of claim 1 wherein said graphical user interface further includes assigning a plurality of said tag to said node in said open hierarchical data structure and displaying said plurality of said tag.

6. The software menu system of claim 1 wherein said system further includes accessing software for performing statistical analysis and displaying graphical results for said report.

7. The software menu system of claim 1 wherein said graphical user interface further includes programming said report on said database.

8. The software menu system of claim 1 wherein said graphical user interface further includes establishing a user tag group of said tag that identifies a characteristic about said information key in said open hierarchical data structure and generating said report on said user tag group.

9. The software menu system of claim 1 wherein said graphical user interface further includes establishing a path tag group of said tag that identifies said path in said plurality of paths in said open hierarchical data structure and generating said report on said path tag group.

10. The software menu system of claim 1 wherein said graphical user interface further includes generating said report on a group of nodes in said open hierarchical structure that have a distinctive structural relationship to each other.

11. The software menu system of claim 1 wherein said database further includes storing and retrieving a time stamp in said database associated with said entry selected by said end-user and calculating the time it takes said end-user to reach said unit of information at the end of a menu path in said content menu.

12. The software menu system of claim 1 wherein said system further includes generating said report based on a time interval and generating said report based on a number of predefined trigger events.

13. A software menu system consisting of, the means for creating and maintaining an open hierarchical data structure consisting of a plurality of nodes and a plurality of paths that organizes a collection of information and provides the basis for a content menu that enables multiple paths to link to a unit of information in said collection;

the means for generating a menu file from said open hierarchical data structure that is cooperative with a software component that displays a list menu in said content menu that corresponds to a sibling list in said open hierarchical data structure;

the means for displaying a graphical user interface for assigning a tag to a node in said open hierarchical data structure that identifies a characteristic about an information key associated with said node in said open hierarchical data structure;

the means for storing said tag associated with said node in said open hierarchical data structure on computer memory;

the means for fetching said tag on computer memory and adding said tag to said menu file thereby associating said tag with an entry in said list menu;

the means for retrieving said tag when an end-user selects said entry in said list menu;

the means for storing said tag associated with said entry selected by said end-user in a database;

whereas said end-user locates said unit of information in said collection by navigating said content menu;

whereas said menu system manages information about said tag in said database and generates a report on information in said database.

14. The software menu system of claim 13 wherein said system is implemented in a computer program language that is compatible with at least one computer operating system.

15. The software menu system of claim 13 wherein said graphical user interface further includes the means for assigning a tag to a node that identifies a particular path in said plurality of paths in said open hierarchical data structure.

16. The software menu system of claim 13 wherein said graphical user interface further includes the means for displaying an interactive graphical representation of said open hierarchical data structure enabling a developer to navigate said plurality of paths in said open hierarchical data structure.

17. The software menu system of claim 13 wherein said graphical user interface further includes the means for assigning a plurality of said tag to said node in said open hierarchical data structure and displaying said plurality of said tag.

18. The software menu system of claim 13 wherein said system further includes the means for accessing software for performing statistical analysis and displaying graphical results for said report.

19. The software menu system of claim 13 wherein said graphical user interface further includes the means for programming said report on said database.

20. The software menu system of claim 13 wherein said graphical user interface further includes the means for establishing a user tag group of said tag that identifies a characteristic about said information key and the means for generating said report on said user tag group.

21. The software menu system of claim 13 wherein said graphical user interface further includes the means for establishing a path tag group of said tag that identifies said particular path in said plurality of paths in said open hierarchical data structure and the means for generating said report on said path tag group.

22. The software menu system of claim 13 wherein said graphical user interface further includes the means for generating said report on a group of nodes in said hierarchical data structure that have a distinctive structural relationship to each other.

23. The software menu system of claims 13 wherein said database further includes the means to store and retrieve a time stamp in said database associated with said entry selected by said end-user and the means to calculate the time it takes said end-user to reach said unit of information at the end of a menu path in in said content menu.

24. The software menu system of claim 13 wherein said system further includes the means for generating said report at a predefined time interval and generating said report based on a number of predefined trigger events.

* * * * *